United States Patent [19]

Barnhardt, Jr.

[11] 4,002,002

[45] Jan. 11, 1977

[54] INSULATING BUILDING BLOCK

[76] Inventor: Jacob C. Barnhardt, Jr., Springs Road, Mount Airy, N.C. 27030

[22] Filed: Apr. 19, 1976

[21] Appl. No.: 678,054

[52] U.S. Cl. ................................ 52/743; 52/309.4; 52/309.13; 52/405; 264/175; 264/46.6; 264/267

[51] Int. Cl.² ...................... E04G 21/00; B29H 3/00

[58] Field of Search ................ 264/46.6, 46.9, 267, 264/269, 309, DIG. 63, DIG. 64, DIG. 72, DIG. 77; 52/405, 407, 743, 744; 249/175; 425/110

[56] References Cited

UNITED STATES PATENTS

| | | | |
|---|---|---|---|
| 1,884,319 | 10/1932 | Smith | 52/421 |
| 2,611,261 | 9/1952 | Preston | 52/505 |
| 3,204,381 | 9/1965 | Perreton | 52/507 |
| 3,318,062 | 5/1967 | Grants | 52/407 |
| 3,546,833 | 12/1970 | Perreton | 52/405 |
| 3,772,840 | 11/1973 | Hala | 52/407 |
| 3,885,363 | 5/1975 | Whittey | 52/405 |
| 3,936,987 | 2/1976 | Calvin | 52/309 |

FOREIGN PATENTS OR APPLICATIONS

| | | | |
|---|---|---|---|
| 211,026 | 11/1959 | Austria | 52/405 |

*Primary Examiner*—James L. Ridgill, Jr.
*Attorney, Agent, or Firm*—Frederick L. Bergert

[57] ABSTRACT

An insulating building block which is a composite of masonry material and a foam material is disclosed. The building block is obtained by applying a layer of foam material to a longitudinally extending side face of a cavity located within the block. A shield insert may be employed to define that portion of a block cavity which is to receive the foam.

8 Claims, 3 Drawing Figures

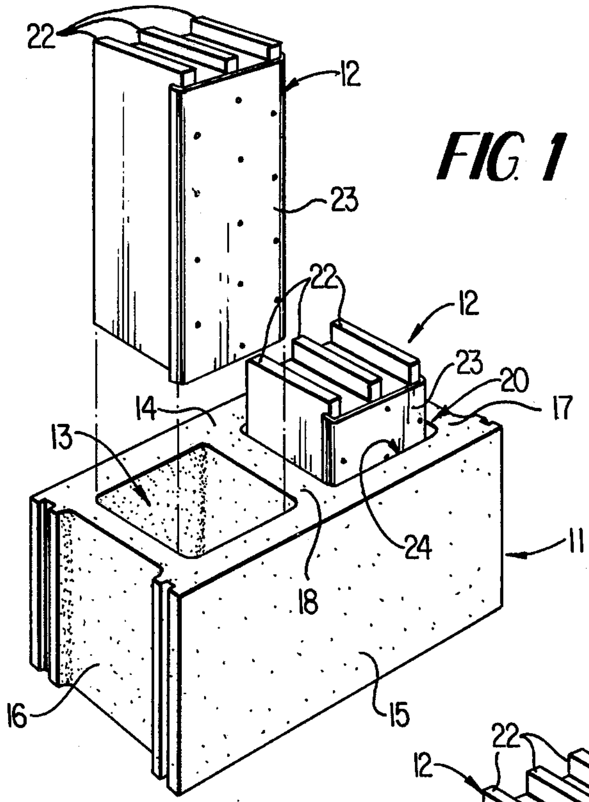
FIG. 1
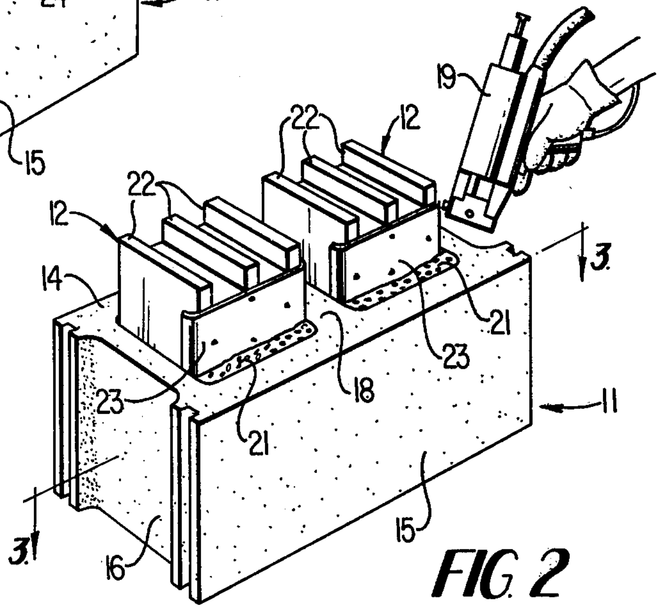
FIG. 2
FIG. 3
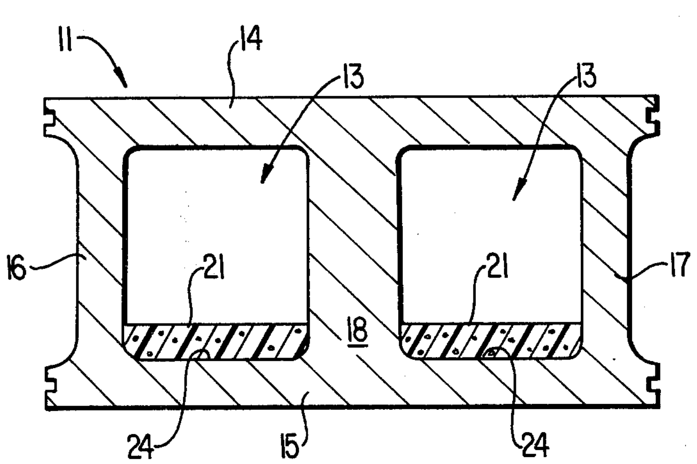

INSULATING BUILDING BLOCK

BACKGROUND AND SUMMARY OF THE INVENTION

The present invention is related to an insulating building block. More particularly, the present invention is related to an insulating building block which is obtained by applying a layer of a foam material to an interior side face of a hollow masonry building block, thus providing a building block having improved energy-saving features.

Previous masonry building blocks having insulating features have included blocks such as those described in U.S. Pat. Nos. 3,704,562 and 3,885,363. These patents are directed to the use of preformed inserts of foam material for building blocks. The use of such inserts has been accompanied by various disadvantages, including the requirement that the insert be formed as a separate unit which must then be inserted into the cavities or hollow portions of the building blocks. Such usage gives rise to various problems, including lack of proper fit of the insert in a particular building block.

By the present invention, there is provided an insulating building block which is a composite of masonry material and a foam material. The insulating building block of the present invention is obtained by applying a layer of foam material to a longitudinally extending side face of each cavity within the hollow block. By the present invention, a block manufacturer is enabled to produce directly at his facility a complete, unitized product having improved energy-saving features over those of the prior art. With the present composite construction, a building wall is properly insulated as soon as the building blocks have been laid. Furthermore, the layer of foam material does not hinder the use of the cavities of the blocks as finger access openings for workmen handling the blocks during construction. In addition, an efficient and economical utilization is made of the foam material to provide a high degree of thermal insulation with a relatively small amount of foam.

BRIEF DESCRIPTION OF THE DRAWINGS

The advantages and features of the insulating building block of the present invention will be more completely understood from the following description of the preferred embodiments, taken in conjunction with the accompanying drawings, wherein:

FIG. 1 is a perspective view showing a building block and a pair of shield inserts employed in the present invention, one of the shield inserts being disposed within one of the two similar cavities of the block and the second shield insert being arranged above the other cavity for entry into the cavity;

FIG. 2 is a perspective view similar to FIG. 1, showing both shield inserts disposed within respective block cavities and with the foam layer having been applied from the foam dispensing gun; and FIG. 3 is a vertical cross-section taken along line 3—3 in FIG. 2 but showing the building block with the shield inserts having been removed.

DESCRIPTION OF THE PREFERRED EMBODIMENTS

In the illustrated embodiment of the present invention as shown in FIGS. 1 through 3, a building block 11 of concrete or the like is employed along with a pair of shield inserts 12, one for each of the two similar cavities 13 shown in the block 11. As shown in FIG. 1, the building block 11 is of a conventional type, having a pair of longitudinally extending side walls 14, 15 which are interconnected by end webs 16, 17 and a transverse intermediate web 18 which separates the cavities 13. Thus the present invention is not intended to be limited to building blocks of any particular configuration or material, the only limitation being that the block have at least one cavity or hollow portion, to the longitudinally extending side face of which the foam material can be applied, as hereinafter described.

In carrying out the method of the present invention for providing an insulating building block, the shield inserts 12 are inserted into the cavities 13 in the block 11, as shown in FIGS. 1 and 2. A release agent is applied to the surfaces of the shield inserts 12 so that foam will not adhere to the shield inserts 12. The release agent may be any of the well-known materials which are used for this purpose, such as silicone, wax or a teflon coating.

In forming the layer of foam, a conventional foam dispensing gun 19 is employed along with a suitable foam source (not shown), with the dispensing gun 19 being aimed at the cavities 20 formed between each shield insert 12 and the block 11. The foam may be a material such as urethane foam or the like which has excellent insulating properties. During application of the foam, the block 11 is preferably placed upon a horizontal supporting surface which will effectively prevent foam from flowing out beneath the cavities 20. As the foam material is sprayed from the dispensing gun 19, the foam will flow into and completely fill the cavities 20 and adhere to the block 11, forming a layer 21 as shown in FIG. 2. For insulating purposes, this layer 21 may have a thickness of from about ¼ to about 4 inches, with the actual thickness being determined primarily by the requirements of climate conditions, depending upon the geographical location in which the blocks are being used.

In FIG. 3, there is shown the foam insulation layer 21 which remains adhered to the building block 11 after the foam has hardened and the shield inserts 12 have been removed. It is seen that the foam layer 21 covers essentially the entire longitudinally extending, vertical side face 24 of each of the cavities 13.

The shield inserts 12 may be of any construction which will provide a plug for the center portion of each cavity 3 of the block 11. Thus, for example, the inserts 12 may be made of wood strips 22 fastened together and having sheet metal 23 wrapped around and secured thereto. The shield inserts 12 should be of a length sufficient to extend the entire vertical dimension of the block 11 and of a width sufficient to be contiguous with the intermediate web 18 and the respective end web 16 or 17, thus effectively preventing foam from flowing beyond the cavity 20 formed between each shield insert 12 and the interior surfaces of the hollow block 11. The side wall of each shield insert 12 which forms one face of the respective cavity 20 should preferably be substantially vertical, in order that the foam layer 21 which is formed on the vertical side face 24 of each cavity 13 will be of uniform thickness over the entire surface of the side face 24.

The foam material may be advantageously applied to the building block 11 after the block has been preheated or by use of the retaining heat developed during curing of the block.

The application of the foam material to one longitudinally extending side face 24 of each cavity 13 provides the improved insulating features of the present invention. However, it is also within the scope of the present invention to provide a space between the shield insert 12 and its respective cavity 13 extending completely around the four sides of the cavity 13 and to apply a layer of foam in this space so that the layer extends continuously around all sides of the cavities 13.

By the present invention, there is provided an economical and efficient method of preparing an insulating building block for use in the construction industry. In providing the layer of foam on the side faces of cavities located within the block, there is thus presented an effective insulating barrier to the flow of heat through the block, and with the foam barrier being provided as an integral part of a composite, one-piece building block unit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

Alternatively, the foam may be applied by spray techniques without the use of the shield insert.

It is claimed:

1. A method for forming a composite insulating building block which comprises:

a. disposing a shield insert within at least one original cavity of a hollow building block to form a relatively smaller cavity between the shield insert and a longitudinally extending side face of said original cavity, said shield insert extending from top to bottom of said original cavity when disposed in said original cavity;

b. dispensing a foam material into the smaller cavity between said shield insert and the side face of said original cavity;

c. allowing said foam material to solidify as it adheres to the side face of said original cavity, thus forming a layer thereon; and d. removing said shield insert from said original cavity.

2. The method of claim 1 wherein the dispensing step comprises dispensing urethane foam.

3. The method of claim 1 which comprises forming said layer of foam having a thickness of from about ¼ to about 4 inches.

4. The method of claim 1 further including applying release agent to said shield insert prior to disposing said insert within said cavity.

5. The method of claim 1 further including heating said building block prior to dispensing of said foam material.

6. The method of claim 1 further including the step of extending said original cavity throughout the entire vertical dimension of said building block.

7. The method of claim 1 further including disposing said shield insert so that its side face which is adjacent said smaller cavity is disposed substantially vertically and parallel to the side face of said original cavity.

8. The method of claim 1 further including providing said smaller cavity between all faces of said original cavity and said shield insert with the foam layer extending completely around said original cavity.

* * * * *